United States Patent [19]
Roth et al.

[11] 3,988,667
[45] Oct. 26, 1976

[54] NOISE SOURCE FOR TRANSFER FUNCTION TESTING

[75] Inventors: Peter R. Roth; Jean-Pierre D. Patkay, both of Los Altos, Calif.

[73] Assignee: Hewlett-Packard Company, Palo Alto, Calif.

[22] Filed: Mar. 6, 1975

[21] Appl. No.: 555,773

[52] U.S. Cl. .......................... 324/57 N; 324/77 B; 325/363; 331/78
[51] Int. Cl.² ........................................ G01R 27/00
[58] Field of Search .............. 324/57 N, 77 B, 78 J, 324/186; 331/78; 325/363

[56] References Cited
UNITED STATES PATENTS

| | | | |
|---|---|---|---|
| 3,072,845 | 1/1963 | Bruck | 324/57 N |
| 3,573,652 | 4/1971 | Charters | 331/78 |
| 3,821,648 | 6/1974 | Campbell | 325/363 |
| 3,886,451 | 5/1975 | Chu et al. | 324/186 |

FOREIGN PATENTS OR APPLICATIONS

| | | | |
|---|---|---|---|
| 207,976 | 3/1968 | U.S.S.R. | 331/78 |

OTHER PUBLICATIONS
Wilkins, A Low Frequency Random Step Generator, Electronic Engineering, June 1964, pp. 386–389.

*Primary Examiner*—Stanley T. Krawczewicz
*Attorney, Agent, or Firm*—Allston L. Jones; Roland I. Griffin

[57] ABSTRACT

A method and apparatus for obtaining an accurate measure of a transfer function of either a linear or the linear part of a nonlinear system. This is accomplished by utilizing an estimation technique using a "periodic-random" stimulus consisting of a random stimulus of a finite record length that is repeatedly applied to the system under test until the stimulus and the system response become essentially periodic. Once periodicity is achieved within the desired accuracy, a first estimate of the transfer function is derived from the measured spectrums of the stimulus and the system response. Another "periodic-random" stimulus, uncorrelated with prior records, is then generated and the above procedure is repeated to achieve an average value of the transfer function within the desired accuracy. Through the use of several "periodic-random" stimuli, leakage and distortion in the measurement is minimized, thus greatly improving the accuracy of the estimation technique in measuring the transfer function of the system under test.

16 Claims, 4 Drawing Figures

NOISE SOURCE FOR TRANSFER FUNCTION TESTING

BACKGROUND OF THE INVENTION

This invention is concerned generally with measurement devices, and, more particularly, with transfer function measurement devices.

Transfer, impedance, and frequency responses are terms used in describing the gain and phase response of an interconnection of physical devices as a function of frequency. These measurements are most useful in describing linear systems, but they may also be used to describe a linear approximation, within a band of frequencies, to a nonlinear system. These transfer functions are conventionally measured by applying a sinusoidal stimulus at a single frequency to the system under test while observing the gain and phase relationships between the stimulus and the system response. This measurement method has certain limitations. If single frequency stimuli are applied successively, then the measurement at each frequency will take a time equal to several of the longest time constants in the measurement system or the system under test (SUT). If the SUT has any nonlinearities, then the distortion components of the sine wave response will affect measurement accuracy unless they are removed by narrow band filtering methods. If a narrow band filter is used, additional errors in the measurement due to filter accuracy are introduced.

A measurement system that can determine the frequency response of the SUT at many frequencies simultaneously can improve the speed of the measurement process. Such a measurement system consists of a stimulus generator connected to the SUT to apply an input stimulus thereto, and a two-channel spectrum analyzer with the first channel measuring the spectrum ($S_x$) of the stimulus applied to the SUT and the second channel measuring the spectrum ($S_y$) of the response of the SUT. In operation, the measurement system applies a stimulus of finite length from the stimulus generator to the SUT, detects the response of the SUT, measures the spectrums $S_x$ and $S_y$, and calculates the transfer or impedance function using $S_x$ and $S_y$. If the measurement system applies a stimulus of finite length to the input of the SUT, several methods (including a digital Fourier transform) can be used to compute a response at many discrete frequencies in a period of time equal to the time needed to measure a single frequency response to a sinusoidal stimulus applied to the SUT. The measurement time may thus be reduced in proportion to the number of spectral lines that may be computed in the time needed to measure the response of the SUT to a single sinusoidal stimulus. To implement this type of measurement requires the use of a broad band stimulus generator. With a broad band stimulus generator several methods may be used to determine the transfer function of the SUT from the input and output spectrums, $S_x$ and $S_y$ respectively. The ouptut spectrum, $S_y$, can be divided by the input spectrum, $S_x$, to form the transfer function of the SUT as shown in equation 1.

$$H(f) = \frac{S_y(f)}{S_x(f)} \qquad (1)$$

A better method is to compute the cross power spectrum between the stimulus and the response of the SUT as in equation 2.

$$, G_{yx}(f) = S_y(f) \, S_x{}^*(f) \qquad (2)$$

The auto power spectrums of the stimulus and the response of the SUT are given in equations 3 and 4.

$$, G_{xx} = S_x(f) \, S_x{}^*(f) \qquad (3)$$

$$, G_{yy} = S_y(f) \, S_y{}^*(f) \qquad (4)$$

The asterisk in each of equations 2, 3 and 4, and in each of the following equations where it appears, indicates the complex conjugate of the so designated function. From these quotations the transfer function $H(f)$ may be computed as $$H(f) = \frac{G_{yx}(f)}{G_{xx}(f)} \qquad (5)$$

If averaged values for the cross and auto power spectrums are computed from an ensemble of sampled records then the transfer and coherence functions may be determined using a least squares estimation technique where $$H(f) = \frac{\overline{G_{yx}(f)}}{\overline{G_{xx}(f)}} \qquad (6)$$

is the form of the least squares estimate of the transfer function and $$\gamma^2(f) = \frac{\overline{G_{yx}(f)} \; \overline{G_{yx}(f)^*}}{\overline{G_{xx}(f)} \; \overline{G_{yy}(f)}} \qquad (7)$$

is the coherence function for this estimate. The fraction of the SUT output power that is due to the SUT input power at a given frequency is represented by $\gamma^2$ and has a value between 0.0 and 1.0. The bar above the functions in these equations indicates the average value of the so designated function. The least squares estimation technique of equations (6) and (7) is simply implemented using a digital processor capable of computing a digital Fourier transform that is well known in the art. These measurement techniques are more fully described in Roth, Peter R., "Effective Measurements Using Digital Signal Analysis," *IEEE Spectrum*, pp. 62–70, April 1971.

The most direct method of implementing the described measurement technique is to use a random noise stimulus which has a relatively flat spectrum over the band of frequencies being measured. A random stimulus has several important advantages in this measurement. It is easily made broad band in nature, delivering all frequencies in the band of interest. When used with the least squares technique of equations (6) and (7) the random stimulus is uncorrelated with noise and its own distortion products, and therefore yields an accurate estimation for $H(f)$ in the presence of noise and nonlinearities.

The elimination of distortion components using a random stimulus is an important result of a measurement procedure which utilizes a random stimulus that is uncorrelated between records. In a spectrum of a random signal the relation between spectral lines is random from sample record to sample record when a collection of estimates is averaged together to yield a final result. Therefore, the distortion products that fall on any component of the response spectrum are uncorrelated from record to record. However, the response at each spectral line is deterministically related to the stimulus by the transfer function being measured. The result is that when the stimulus is uncorrelated with itself over a number of records, an ensemble record average of the cross spectrum between stimulus and response will reduce both noise and nonlinearity introduced by the SUT in proportion to the number of averages used.

The limitation on the use of random noise as a stimulus is the nonperiodicity of the continuous random noise. When any continuous signal is sampled for a finite period of time the spectrum of the resultant continuous signal of a finite record length is the spectrum of the continuous signal convolved with, or smeared by, the spectrum of the window function that is, or that is derived from, a sine function (i.e. sin $x/x$). The result is that each spectral line of the resultant frequency spectrum contains components from other frequencies. The effect on the measurement is that the transfer function is not the result of a measurement at a single frequency, but a measurement that is the weighted average given by the spectrum of the window function. This is analogous to the effect that would be observed using a continuous filter of finite bandwidth to observe the random signal. This phenomenon is called leakage in the literature and is more fully described in page 45 of Bergland, G. D., "A Guided Tour of the Fast Fourier Transform," *IEEE Spectrum*, Vol. 6, pp. 41–52, July 1969.

The leakage effect due to the continuous nature of random noise can be overcome by using a periodic broad band stimulus. Pseudo random sequences are one example of a periodic broad band stimulus, and these sequences are well known in the art. (One method for generating a pseudo random sequence is discussed in the "Operating and Service Manual" for the Hewlett-Packard Noise Generator Model 3722.) If the periodic stimulus has a period equal to the finite record length of the measured signal, leakage will be eliminated. In use, the periodic stimulus is applied to the SUT and allowed to repeat until the transient response from the SUT has decayed to a value small enough that the response of the SUT can be considered a periodic signal. The spectrum of the SUT response after the initial output transients have decayed to zero consists of a set of spectral lines spaced apart by $\Delta f$ Hz, where $\Delta f = 1/T$ and T is the period of the signal applied to the SUT. When a finite record length of a period T is used to compute the spectrum of the stimulus and the response of the SUT, each sinc function that is centered on each frequency of the applied stimulus is not affected by other spectral lines of the stimulus. This condition exists because the zeros of the sinc function spectrum of the sampling envelope are spaced $\Delta f$ Hz apart, and all other lines of the spectrum fall on these zero points. A transfer function measured with a periodic stimulus will then measure the response of a system at each frequency with no effect from other frequencies.

The limitation of the periodic stimulus method is that different frequencies in the stimulus signal maintain a fixed relation to each other from measurement period to period. When nonlinearities are present in the SUT response, the distortion products at each frequency will maintain a fixed, correlated relation to the applied stimulus from record to record. The least squares technique will not eliminate the nonlinear components in the transfer function estimate, but will only discriminate against uncorrelated noise in the measurement. Because of the lower spectrum signal-to-noise ratio when broad band stimuli are used, distortion components in relatively linear systems can have a significant effect on measurement accuracy.

SUMMARY OF THE INVENTION

In accordance with the illustrated embodiment, the present invention provides a method and apparatus for measuring a transfer function of the SUT by an estimation technique. The present invention employs a stimulus which might be described as a "periodic-random" stimulus that eliminates distortion introduced by the use of periodic stimuli and leakage introduced by the use of random stimuli.

It is well known that signals periodic in the measurement window do not have the leakage problem that is associated with random signals. The present invention therefore utilizes a random stimulus of a finite record length which is repeatedly applied to the SUT until the stimulus and the system response approach periodicity. After periodicity is achieved the measurements are made to calculate a first measurement of the estimates of the transfer function for the SUT. This first measurement of the system transfer function is thus relatively unaffected by the characteristic leakage of random signals since the measurement is not made until the stimulus and the response become substantially periodic.

To improve the accuracy of the measured system transfer function, additional finite record length random stimuli uncorrelated with each other are used to obtain additional transfer function estimates as discussed above. These various transfer function estimtes are continuously averaged together until result with the desired accuracy is obtained. The final result obtained by this method is unaffected by distortion which a periodic signal would generally introduce. This independence of distortion is achieved through the use of uncorrelated random signals in each of the finite record length random stimuli.

The invention permits the measurement of the transfer function of linear systems, as well as the linear part of non-linear systems within a band of frequencies. This is possible since the system response is relatively independent of the effect of leakage and distortion. Leakage is eliminated since each record is periodic, and noise and distortion are eliminated since each record is uncorrelated with every other record. The error in a measurement, as determined by the variance associated with the measurement of uncorrelated signals, can be reduced in proportion to the number of averages used to make up the measurement.

An apparatus to implement this method includes a random stimulus generator, a pair of switches, and a circulating memory. The random stimulus generator continuously generates random words which are applied to the circulating memory and the SUT through a first one of the two switches during the first record period. This first switch is then opened and the second switch closed to repeatedly apply the stored random words to the SUT and the input of the circulating memory for as many record periods as necessary to achieve the desired periodicity of the stimulus and response of the SUT. This apparatus can be modified to use a stimulus word length of from one bit to as many bits as desired, and as many or as few words as desired without loss of generality. This apparatus can also be implemented with either analog or digital components in approximately the same form.

Another method for generating a repeating random record utilizes a computational algorithm such as the one discussed in Gold, B. and Rader, C., *Digital Processing of Signals*, McGraw-Hill, N.Y. 1969, pp. 144–146. This method is initiated by selecting a kernal that is then utilized to compute a set of random words of the desired record length using a random number generator algorithm. An identical set of random words can then be repeatedly generated by restoring the kernal to its initial value and restarting the computation. After a particular random record has been repeated a sufficient number of times, a new uncorrelated repeating random record can be initiated by selecting another kernal.

DESCRIPTION OF THE PREFERRED EMBODIMENT

Figure 1:
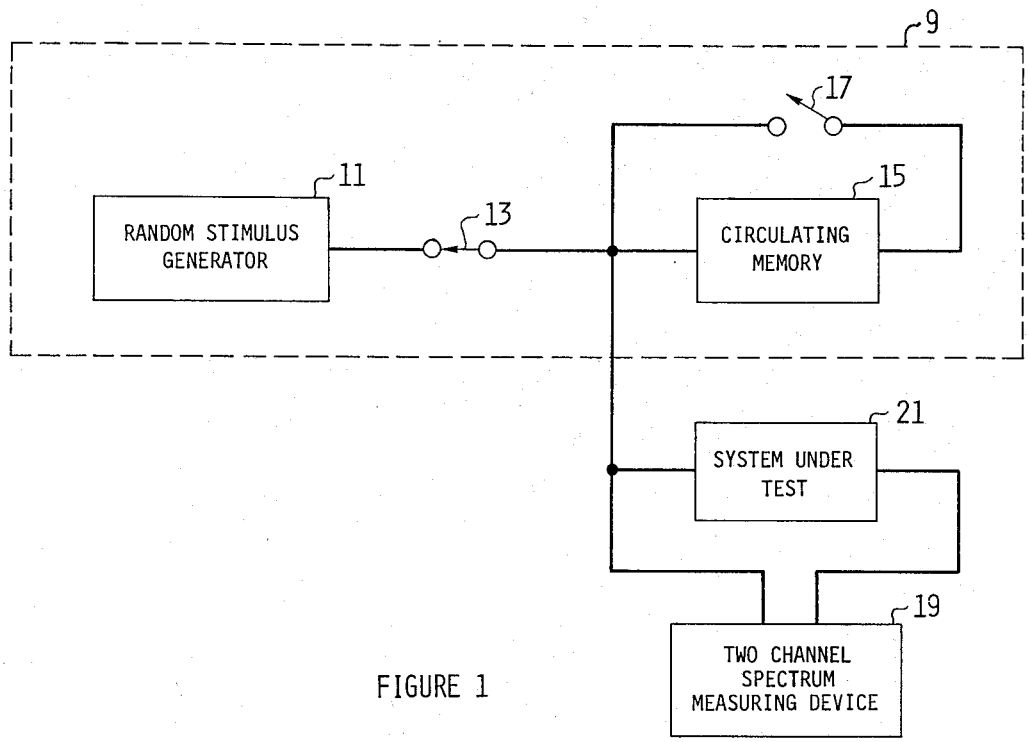
FIG. 1 is a blcok diagram illustrating one embodiment of the transfer function estimation technique of the present invention utilizing a two channel spectrum measuring device.

The embodiment of the invention illustrated in FIG. 1 includes a "periodic-random" stimulus generator 9, a two channel spectrum measuring device 19 (e.g. Hewlett-Packard Fourier Analyzer Model 5451), and a SUT 21. The "periodic-random" stimulus generator 9 includes a random stimulus generator 11 (e.g. a noise diode), a first switch 13, a circulating memory 15 of the desired width and length (e.g. a shift register or a group of delay lines), and a second switch 17. Random stimulus generator 11 produces either a continuous or a sampled random stimulus utilizing any one of a number of well-known methods in the art. Initially switch 13 is closed and switch 17 is open resulting in a stimulus record of length T seconds being applied to SUT 21 from random stimulus generator 11 and stored in circulating memory 15. After the initial period of T seconds switch 13 is opened and switch 17 is closed. The stimulus record of T seconds in length is repeatedly read from the circulating memory 15 for as many T second periods as necessary to assure that the response signal from SUT 21 has become substantially periodic. When the response signal of SUT 21 is periodic within the desired accuracy, the spectrum measuring device 19 records the stimulus and response signals of SUT 21 during identical record period of T seconds in length which start at the same relative point of these signals. From these recorded signals, the spectrum measuring device 19 can compute the transfer function of SUT 21 or the first ensemble record of the cross and auto power spectrums of the recorded signals. By computing these spectrums or this transfer function of SUT 21 with a computation window equal in length to the period of the "periodic-random" stimulus, the resultant spectrums or transfer function will be relatively unaffected by leakage.

The above process is then repeated using another signal record from random stimulus generator 11. The ensemble record computed during each signal record period is uncorrelated with the other ensemble records since each ensemble record is derived from a different uncorrelated signal record from random stimulus generator 11. Only the spectral components in the cross spectrum or the transfer function of SUT 21 which are a result of the linear, deterministic portion of the transfer function are coherent from stimulus signal record to stimulus signal record. Thus, if a set of ensemble records, each of which has been computed from a different "periodic-random" stimulus of period T, are averaged together the result will be a measurement of the system gain and phase unaffected by distortion which a periodic stimulus would introduce and by leakage or nonlinearities. This method then will permit the measurement of the transfer function of linear systems and of the linear part of nonlinear systems within a band of frequencies.

Figure 2:
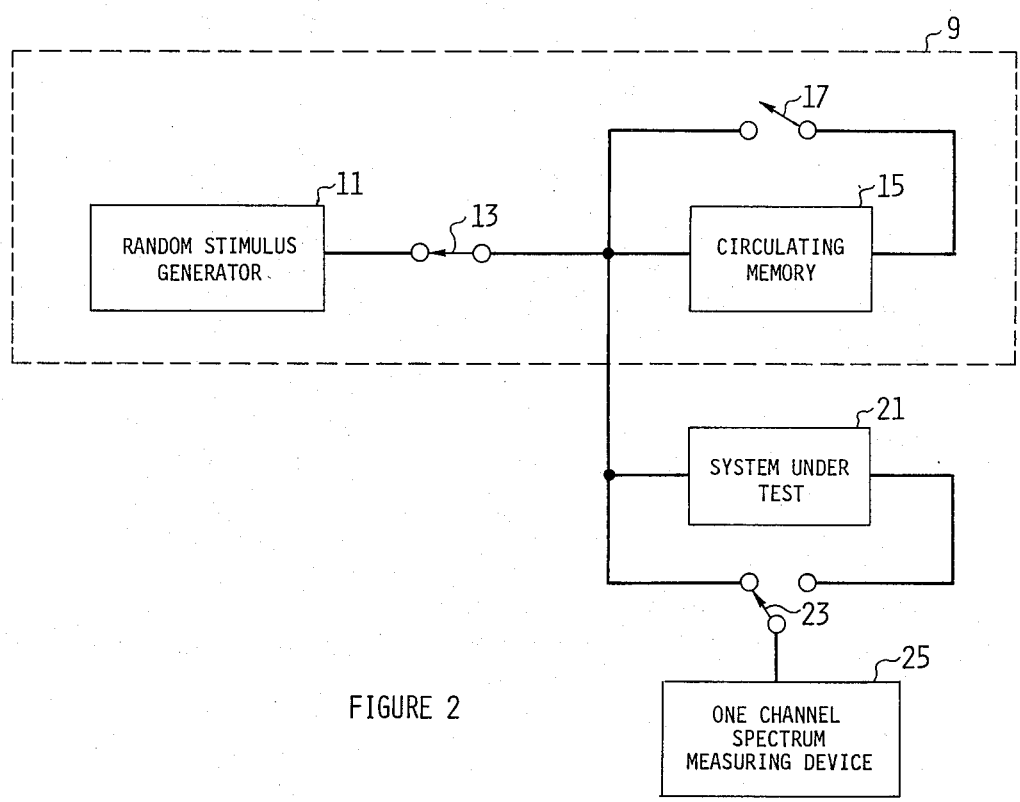
FIG. 2 is a block diagram illustrating another embodiment of the transfer function estimation technique of the present invention utilizing a one channel spectrum measuring device.

The embodiment of the invention illustrated in FIG. 2 includes the "periodic-random" stimulus generator 9 (as in FIG. 1), a third switch 23, a one channel spectrum measuring device 25 (e.g. Hewlett-Packard Fourier Analyzer Model 5451), and SUT 21. In this configuration the measurement sequence starts with switches 13, 17, and 23 in the positions shown in FIG. 2 by applying a random stimulus sequence from generator 11 to circulating memory 15 and SUT 21 for one period T seconds in length. At the end of the first period, the position of switches 13 and 17 are reversed repeatedly applying the output of circulating memory 15 to the input of SUT 21. During this portion of the measurement cycle, switch 23 remains in the illustrated position of FIG. 2. When a sufficient number of output records from circulating memory 15 have been applied to the SUT input to make the stimulus periodic (e.g. for many SUT's the stimulus can be considered periodic after 3T seconds), a record of length T seconds is recorded by spectrum measuring device 25. Switch 23 is then connected to the SUT output and enough additional records are allowed to circulate through SUT 21 to assure that the SUT response signal of length T is now recorded by spectrum measuring device 25. From these recorded signals, the spectrum measuring device 25 computes an ensemble record estimate from the cross and auto spectrums or transfer functions.

The method of operation of the FIG. 2 system is now repeated for a new stimulus uncorrelated with prior records from the random signal generator 11. The process is repeated as many times as necessary to generate ensemble record estimates to eliminate the noise and distortion effects of SUT 21. By using the one channel spectrum measuring device 25 the transfer function computed by using the "periodic-random" stimulus has no errors due to cross-talk or mismatch between the measurement channels of the spectrum measuring device. This measurement technique also provides a transfer function relatively unaffected by distortion and leakage.

The "periodic-random" generator 9 of FIGS. 1 and 2 can be implemented with either analog or digital components in approximately the same form. The format of the stimulus to SUT 21 can utilize a word length of from one bit to as many bits as desired, and as many or as few words as desired without loss of generality.

Figure 3:
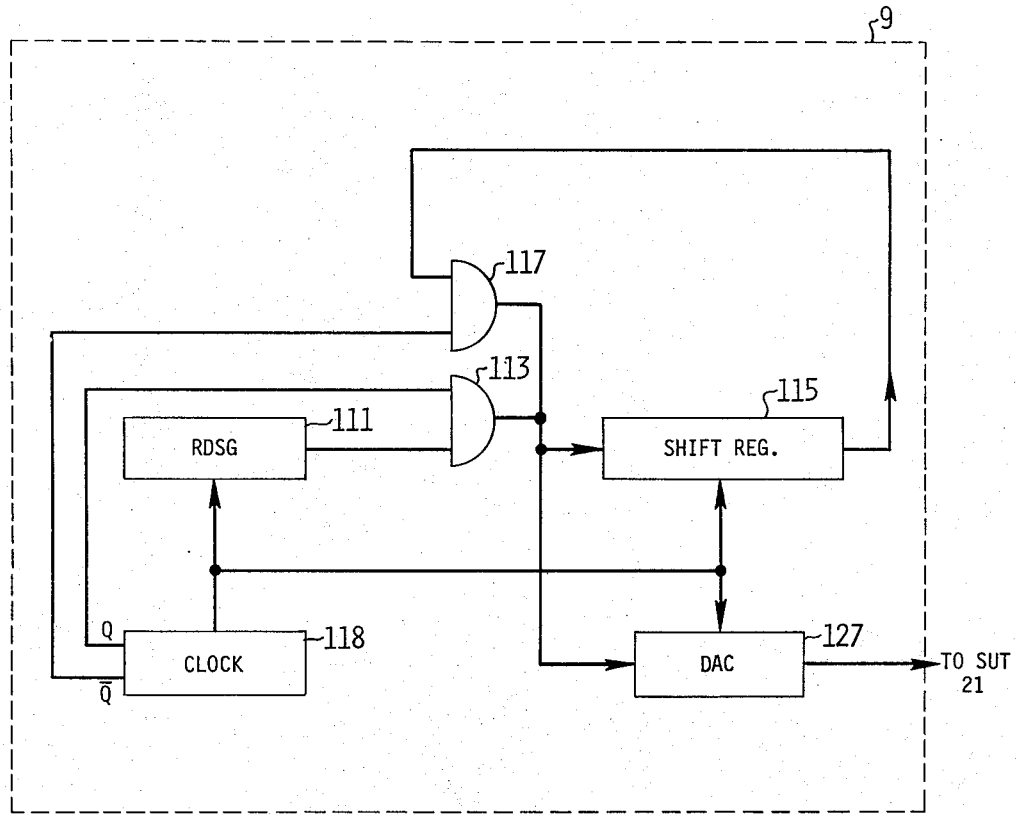
FIG. 3 is a schematic diagram illustrating one preferred embodiment for generating "periodic-random" stimuli to the SUT.

In FIG. 3, the "periodic-random" stimulus generator 9 is implemented digitally. This embodiment includes a random digital sequence generator (RDSG)111 (e.g. Hewlett-Packard Noise Generator 3722), a pair of gates 113 and 117, a circulating shift register 115, a clock 118, and a digital to analog converter 127. In this embodiment, RDSG 111 provides a random sequence stimulus by any of a number of well-known methods as does random stimulus generator 11. Gates 113 and 117 under the control of signals Q and $\bar{Q}$ respectively from clock 118 perform the function of switches 13 and 17. Also, circulating shift register 115 of the desired length and width performs the function of circulating memory 17. In operation, signal Q is initially made true which activates gate 113 and deactivates gate 117. For a first record period of T seconds the random digital sequence will be read into shift register 115 and to DAC 127 which is connected to the input of SUT 21. After the first record period of T seconds, Q is made false which deactivates gate 113 and activates gate 117. The digital sequence reads out of shift register 115 at the same clock rate as the digital random sequence from RDSG 111 to DAC 127 for as many records as required to make the system response periodic. The measurement then proceeds as described by either of the methods illustrated in FIGS. 1 and 2. DAC 127 can be implemented by any known method including a transversal tapped filter which utilizes a shift register and a multi-tapped resistor. RDSG 11 and shift register 115 can be implemented in a one bit wide format and used in conjunction with a transversal filter to obtain a more continuous stimulus signal.

Figure 4:
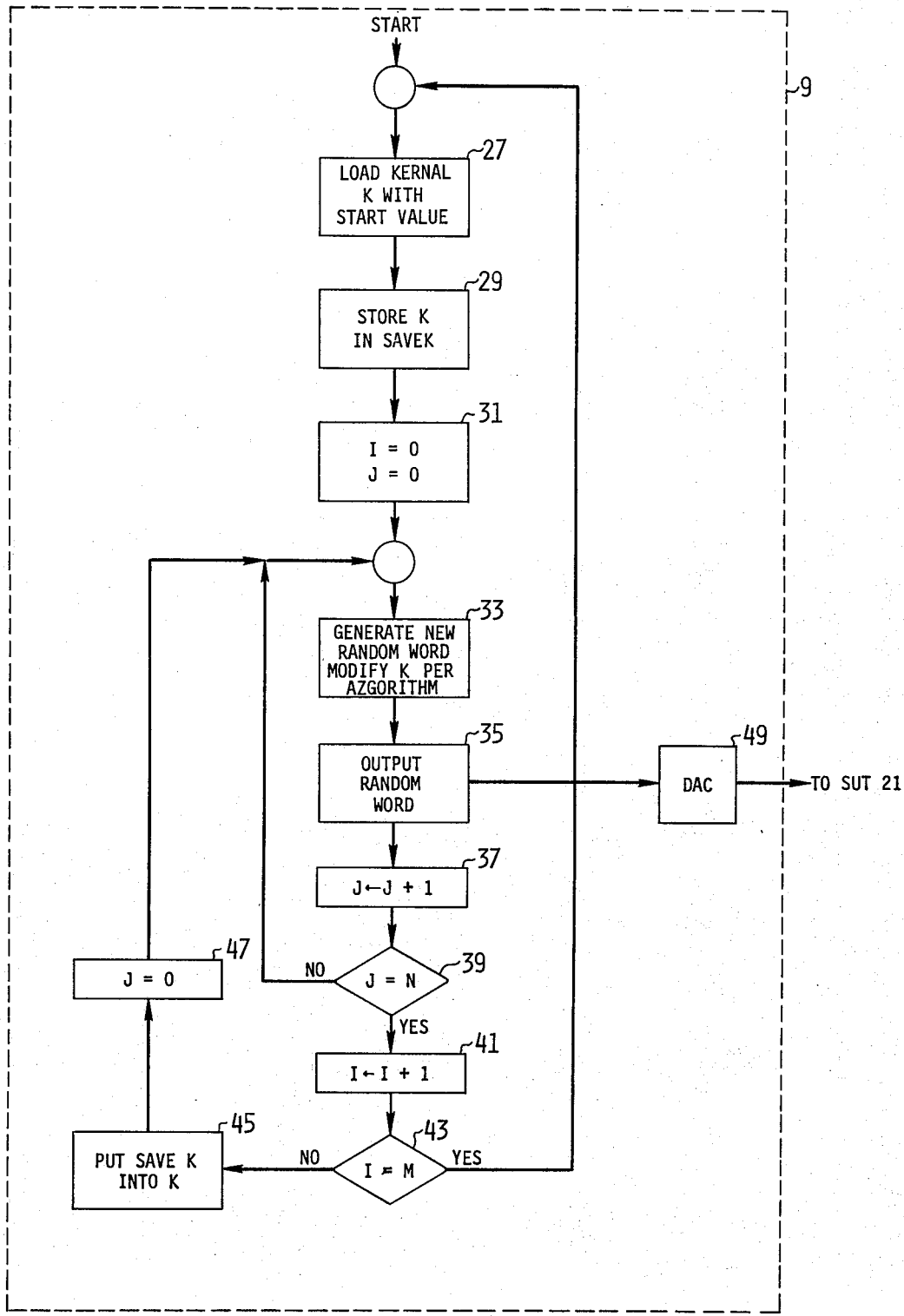
FIG. 4 is a flow diagram illustrating another preferred embodiment for generating "periodic-random" stimuli to the SUT.

FIG. 4 illustrates a computational method for generating a "periodic-random" stimulus signal. The computation is initiated by selecting a kernal, K, and loading the selected value of K into the computational means (Block 27). The value of K is next stored in a memory location as indicated by SAVE K (Block 29) and index variables I and J are set to zero (Block 31). Index variable J represents the number of the word in the random stimulus signal and has a maximum value of N. Index variable I represents the number of times that the N word random stimulus has been repeatedly applied to SUT 21. The index I has a maximum value of M.

The next step in the computation starts with the kernal to generate a random word, with a selected number of bits, utilizing an algorithm such as the Gold and Radar Algorithm as described in the earlier referenced text (Block 33). This random word is then outputted to SUT 21 (Block 35) via DAC 49. Index J is next advanced by 1 (Block 37) and J is then tested against its maximum value, N (Block 39).

If J is less than N, then the algorithm (Block 33) is restarted to generate another word of the stimulus. The functions of Blocks 35 through 39 are then repeated. If J equals N (Block 39), then the stimulus to SUT 21 is complete and the repeat mode of the computation is begun.

The repeat mode begins by advancing index I by 1 (Block 41) and I is then tested against its maximum value, M (Block 43). If I is less than M, the starting value of K is recovered from memory (Block 45), index J is reset to zero (Block 47), and the generation of an identical N word random stimulus to SUT 21 is obtained in the same manner discussed above from Blocks 33 through 39. If I equals M, then a new kernal K is selected to initiate the generation of another "periodic-random" stimulus to SUT 21 that is uncorrelated with all previous stimuli.

We claim:
1. A method of generating a group of periodic random stimuli for application to a system under test, the method comprising the steps of:
   a. generating a finite record length random stimulus of T seconds in length;
   b. storing the finite record length random stimulus generated in step a;
   c. repeatedly applying the stored finite record length random stimulus to the system under test a selected numer of times; and
   d. repeating steps a through c, and for each repetition generating and applying to the system under test a periodic random stimulus that is uncorrelated with all prior periodic random stimuli.

2. A method of measuring transfer functions of a system under test, the method comprising the steps of:
   a. generating and applying a periodic-random stimulus of period T to the system under test;
   b. measuring the spectrum of the stimulus during a period of T seconds after the stimulus becomes periodic within the desired accuracy;
   c. measuring the spectrum of the response of the system under test after the system response becomes periodic within the desired accuracy during a subsequent period of T seconds starting at a known point relative to the starting point at which the measurement of step b is started;
   d. computing a first estimate of the transfer function of the system under test from the two measured spectrums;
   e. repeating steps a through d to obtain an additional estimate of the transfer function of the system under test using a periodic-random stimulus that is uncorrelated with previous stimuli;
   f. averaging together each additional estimate and the average of the previously obtained estimates of the transfer function of the system under test; and
   g. repeating steps e and f a sufficient number of times to obtain an average estimate of the transfer function of the system under test within a selected accuracy.

3. The method according to claim 2, wherein the step of generating a periodic-random stimulus comprises the steps of:
   a. generating a finite record length random stimulus of T seconds in length; and
   b. repeating the finite record length random stimulus a selected number of times.

4. The method according to claim 3 wherein the spectrums of the stimulus and response of the system under test are measured utilizing a single channel spectrum measuring device.

5. A method of measuring transfer functions of a system under test, the method comprising the steps of:
   a. generating a finite record length random stimulus;
   b. repeatedly applying the finite record length random stimulus to the system under test;
   c. measuring the spectrums of the stimulus and response of the system under test during identical periods of T seconds in length after the response to the system under test becomes periodic within the desired accuracy;

d. computing a first estimate of the transfer function of the system under test from the two measured spectrums;
e. repeating steps a through d to obtain an additional estimate of the transfer function of the system under test using a finite record length random stimulus that is uncorrelated with previous stimuli;
f. averaging together each additional estimate and the average of the previously obtained estimates of the transfer function of the system under test; and
g. repeating steps e and f a sufficient number of times to obtain an average estimate of the transfer function of the system under test within selected accuracy.

6. The method according to claim 5 wherein the step of measuring the spectrums of the stimulus and response of the system under test comprises the step of measuring the spectrums simultaneously during the same period of T seconds.

7. The method according to claim 5 wherein the step of measuring the spectrums of the stimulus and response of the system under test comprises the steps of:
measuring one of the spectrums during one period of T seconds; and
measuring the other of the spectrums during an identical subsequent period of T seconds.

8. The method according to claim 7 wherein the spectrums of the stimulus and response of the system under test are sequentially measured utilizing a single channel spectrum measuring device.

9. An apparatus for generating a group of periodic random stimuli for application to a system under test, the apparatus comprising:
random stimulus generator means for generating a finite record length random stimulus of T seconds in length and applying said stimulus to the system under test;
stimulus storing means responsive to the finite record length random stimulus; and
stimulus repeating means responsive to the stimulus storing means for repeatedly applying the stored finite record length random stimulus of T seconds in length to the system under test a first selected number of times;
said random stimulus generator means being retriggered a second selected number of times to generate, store and repeat a series of finite record length random stimuli each of T seconds in length and uncorrelated with all other stimuli upon the completion of the repetition of the preceding stimulus.

10. The apparatus as in claim 9, wherein:
the stimulus storing means comprises circulating memory means having an input and an output port, said input port being connected to said random stimulus generator means and the system under test, said circulating memory means further being initially responsive to the stimulus from the random stimulus generator means for storing the finite record length random stimulus of T seconds in length, the storable record length being determined by the length of the circulating memory means; and
the stimulus repeating means comprises switch means initially open and connected between the input and output ports of the circulating memory means for applying repeatedly the stored finite record length random stimulus to the system under test and the circulating memory means after the initial application of the finite record length random stimulus from said random stimulus generator means, the switch means being subsequently closed at the end of the first finite record length record stimulus.

11. The apparatus acording to claim 10 wherein the stimulus repeating means further comprises a digital to analog converter means connected serially between the system under test and the junction of the random stimulus generator means and the switch means for applying an analog stimulus to the system under test.

12. The apparatus according to claim 11 wherein the random stimulus generator means and the circulating memory means are implemented in a one bit wide word format and the digital to analog converter means comprising a transversal filter for obtaining a continuous stimulus signal.

13. The apparatus according to claim 9, wherein the random stimulus generator means, the stimulus storing means, and the stimulus repeating means comprise:
a computational means for generating a series of random words to form a finite record length random stimulus from a kernal; and
an output means responsive to the finite record length random stimulus and connected to the system under test for applying that stimulus to the system under test;
said computational means also being connected to repeatedly resotre the selected kernal and to initiate the generation of an identical finite record length random stimulus and to apply said stimulus to the system under test a first selected number of times, after which a next kernal is selected a second selected number of times and the computational means generates and repeats said first selected number of times a finite record length random stimulus for each additional kernal that is uncorrelated with all other stimuli for application to the system under test by the output means.

14. An apparatus for generating a group of periodic random stimuli for application to a system under test, the apparatus comprising:
computational means for generating and repeating a finite record length random stimulus of T seconds in length a first selected number of times, and for sequentially generating and repeating the first selected number of times each of a second selected number of additional uncorrelated finite record length stimuli each of T seconds in length; and
output means for applying the finite record length random stimuli to the system under test.

15. The apparatus as in claim 14, wherein the computational means comprises a digital computer.

16. The apparatus as in claim 14, wherein the output means comprises digital to analog converter means for applying an analog stimulus to the system under test.

* * * * *